United States Patent
Pahlevaninezhad et al.

(10) Patent No.: US 11,777,336 B2
(45) Date of Patent: Oct. 3, 2023

(54) PV INVERTER APPARATUS WITH ENERGY STORAGE CAPABILITY

(71) Applicant: Sparq Systems Inc., Kingston (CA)

(72) Inventors: Majid Pahlevaninezhad, Kingston (CA); Praveen Jain, Kingston (CA)

(73) Assignee: Sparq Systems Inc., Kingston (CA)

(*) Notice: Subject to any disclaimer, the term of this patent is extended or adjusted under 35 U.S.C. 154(b) by 0 days.

(21) Appl. No.: 17/876,835

(22) Filed: Jul. 29, 2022

(65) Prior Publication Data

US 2023/0246477 A1    Aug. 3, 2023

Related U.S. Application Data

(60) Provisional application No. 63/304,350, filed on Jan. 28, 2022.

(51) Int. Cl.
*H02J 7/35* (2006.01)
*H02M 3/158* (2006.01)
*H02J 3/38* (2006.01)
*H02J 7/00* (2006.01)

(52) U.S. Cl.
CPC ............ *H02J 7/35* (2013.01); *H02J 3/381* (2013.01); *H02J 7/0068* (2013.01); *H02J 7/00711* (2020.01); *H02J 7/00712* (2020.01); *H02M 3/1584* (2013.01); *H02J 2207/20* (2020.01); *H02J 2300/26* (2020.01)

(58) Field of Classification Search
CPC ...... H02J 7/35; H02J 7/00711; H02J 7/00712; H02J 3/381; H02J 3/38; H02J 7/00; H02J 7/0068; H02J 2207/20; H02J 2300/26; H02M 3/1584; H02M 3/158
See application file for complete search history.

(56) References Cited

U.S. PATENT DOCUMENTS

2011/0006600 A1*  1/2011  Fontana .......... H02J 1/10
                                                 361/679.01

* cited by examiner

*Primary Examiner* — Robert L Deberadinis
(74) *Attorney, Agent, or Firm* — Brion Raffoul (57) ABSTRACT

Systems and methods for providing AC power to a power grid using renewable energy sources as well as energy storage devices. A control system controls multiple DC/DC converters that are coupled to renewable energy sources as well as to one or more energy storage devices. The control system also controls the charge/discharge of the energy storage devices. Each DC/DC converter control block in the control system automatically detects whether to perform MPPT on the renewable energy source or to control the discharge of the energy storage devices. Each DC/DC converter control block ensures that power from the renewable energy source or from the energy storage device is converted and provided to the power grid.

12 Claims, 9 Drawing Sheets

Prior Art

FIG. 3

Prior Art

PV INVERTER APPARATUS WITH ENERGY STORAGE CAPABILITY

RELATED APPLICATIONS

This application claims the benefit of U.S. Provisional Application No. 63/304,350 filed on Jan. 28, 2022.

TECHNICAL FIELD

The present invention relates to systems, methods, and devices relating to power conversion from renewable power sources for provision to a power grid. More specifically, the present invention relates to using a unified controller for controlling multiple DC/DC converters coupled to renewable power sources and to energy storage devices. The unified controller provides maximum power point tracking for converters and provides charge/discharge functions for the energy storage devices.

BACKGROUND

There is a growing number of photovoltaic (PV) applications where direct current/alternating current (DC/AC) inverters are required to provide maximum power point tracking (MPPT) to harvest maximum solar energy from PV panels and to thereby feed clean AC electricity into the power grid. However, the energy generated by solar energy harvesting systems depends on weather conditions and, as such, the availability of such power can be intermittent. Energy storage systems can effectively address the issue of intermittency for solar energy harvesting systems by storing energy that has been harvested and then releasing that energy when needed.

Figure 1:
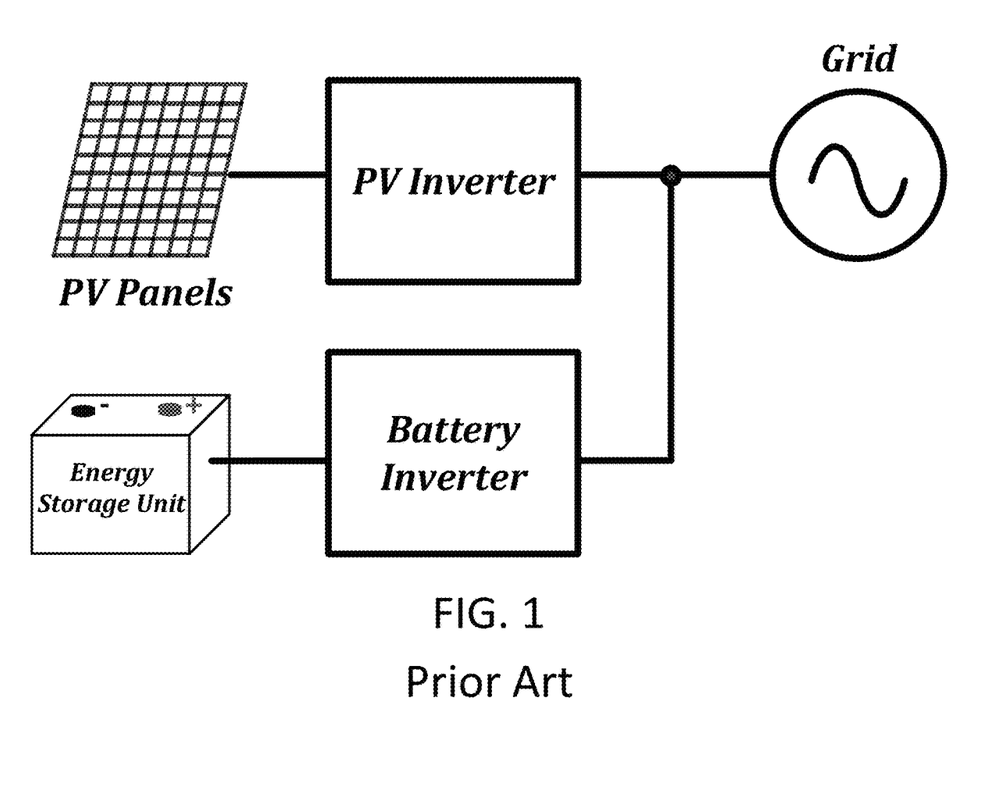
FIG. 1 is a block diagram of a solar energy harvesting system according to the prior art.

Usually, in configurations where PV panels and energy storage devices are used, two different power electronic converters are used, with one type being for PV panels and another type for the energy storage device. FIG. 1 is a block diagram of an existing solar energy harvesting systems with an energy storage capability. As can be seen, two separate power electronic converters are used in the system. The PV inverter is used to perform MPPT for the PV panels and to convert the harvested energy to AC form that is compatible with the AC grid. The battery/energy storage device inverter, on the other hand, controls the charge-discharge of the energy storage device and converts power from the energy storage device from DC to AC. One issue with this architecture is that two separate power electronic converters are needed and the system may not be cost-effective. As well, when two separate power electronic converters are used, the PV inverter does not have the real-time information of the battery/energy storage device (e.g., state of charge, etc.) and the battery inverter does not have the real-time information of the PV panels (e.g., available power, etc.). Thus, this architecture is not able to optimise the power flow between different components of the system (i.e., PV, battery, grid, and loads).

Figure 2:
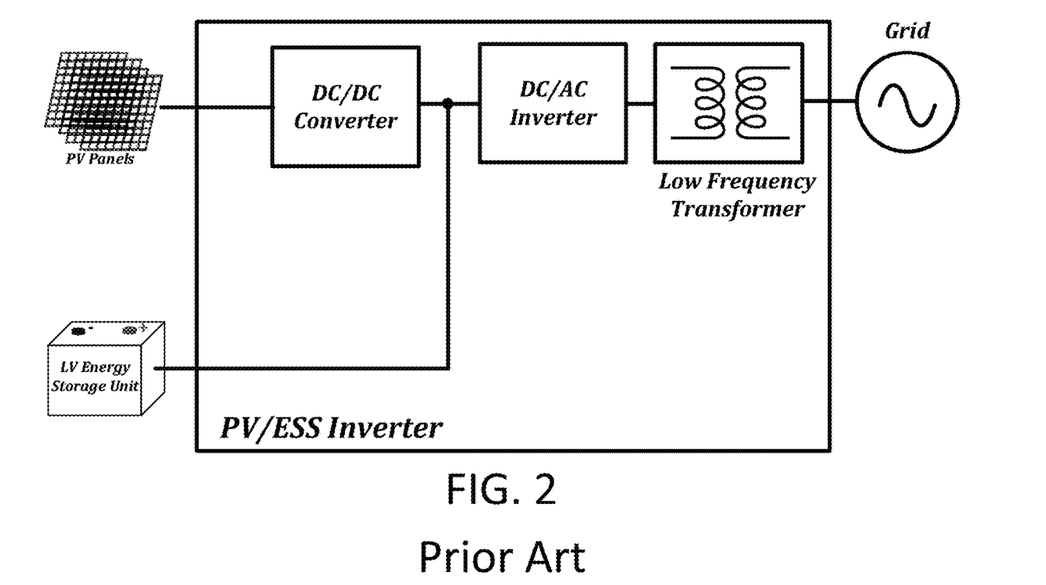
FIG. 2 is an example of an architecture that combines PV panels and energy storage devices for providing AC power to a grid according to the prior art.

In order to address the above issues, other architectures that can combine both the PV panel and the battery/energy storage device were introduced. FIG. 2 shows an exemplary arrangement of such an architecture. As can be seen from FIG. 2, in this architecture, the power electronic converter includes a DC/DC converter between the PV panel and the battery, a DC/AC inverter to convert DC power to AC power, and a low frequency transformer to increase the voltage and provide galvanic isolation. In this architecture, the primary side of the transformer is low voltage (e.g., ~48V) and the secondary side is high voltage (~240V). Thus, the electronic components that are used can be components with low voltage ratings. The main drawback of this architecture is the low frequency transformer. Such a transformer is very bulky, heavy, and has significant power losses. Thus, this architecture cannot be used for higher power (i.e., higher than a few kilowatts) and is not very scalable in terms of power.

Figure 3:
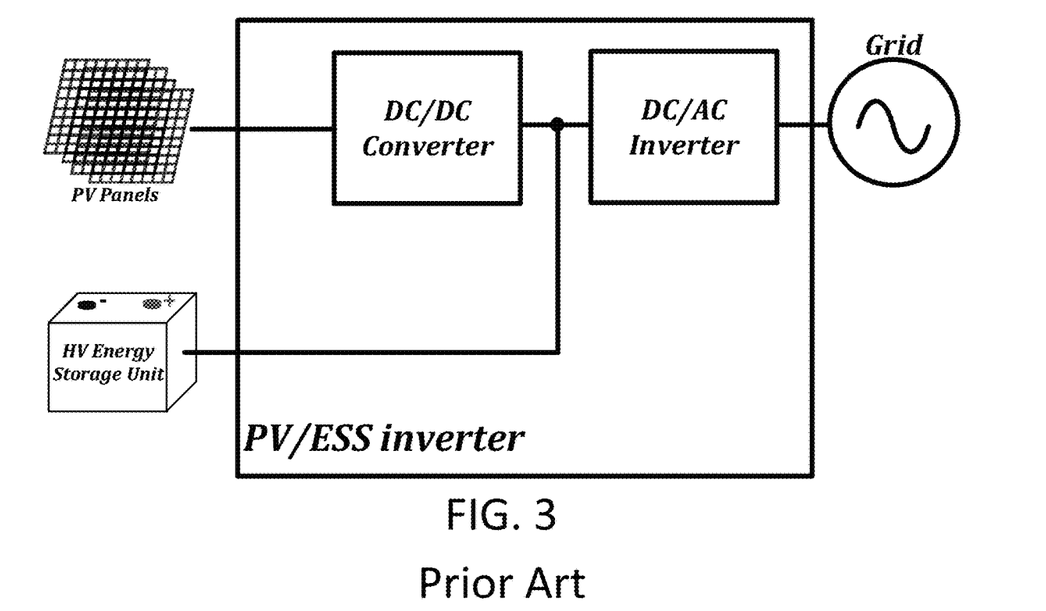
FIG. 3 is another example of an architecture for providing AC power to a power grid that does not use a low frequency transformer according to the prior art.

In order to eliminate the low frequency transformer, the DC/DC converter can be designed to provide isolation. FIG. 3 shows such an architecture that does not use a low frequency transformer (Prior Art). According to the architecture in FIG. 3, the DC/DC converter provides enough gain as well as the galvanic isolation. High efficiency and high power density can therefore be achieved with this architecture. However, the energy storage device needs to be high voltage (higher than the peak of the grid voltage). As an example, if the inverter is designed to operate with the universal voltage range (e.g., Vrms(max)=264, Vpeak=372), the minimum voltage of the energy storage device should be fairly high (e.g., ~400V). Thus, the voltage range of the energy storage device is very limited, and many types of batteries cannot be used with this architecture. Also, this architecture may have lower reliability due to the use of high voltage energy storage devices.

Based on the above, there is therefore a need for systems and devices which mitigate if not avoid the shortcomings of the prior art.

SUMMARY

The present invention provides systems and methods for providing AC power to a power grid using renewable energy sources as well as energy storage devices. A control system controls multiple DC/DC converters that are coupled to renewable energy sources as well as to one or more energy storage devices. The control system also controls the charge/discharge of the energy storage devices. Each DC/DC converter control block in the control system automatically detects whether to perform MPPT on the renewable energy source or to control the discharge of the energy storage devices. Each DC/DC converter control block ensures that power from the renewable energy source or from the energy storage device is converted and provided to the power grid.

In a first aspect, the present invention provides a system for feeding AC power to a power grid, the system comprising:
  a DC/AC inverter;
  a plurality of DC/DC converters, each DC/DC converter being directly coupled between an energy source and said DC/AC inverter;
  a DC/DC charger coupled to at least one of said plurality of DC/DC converters and an energy storage device;
  a control system for controlling said DC/AC inverter and for controlling at least one of said plurality of DC/DC converters and for controlling said DC/DC charger;
wherein
  said DC/AC inverter is coupled between said power grid and said plurality of DC/DC converters;
  said energy source is a renewable energy source;
  for each of said plurality of DC/DC converters controlled by said control system, said control system automatically detects whether said DC/DC converter is operated in energy storage mode or in energy source mode;
  for each of said plurality of DC/DC converters controlled by said control system, when said DC/DC converter is in energy storage mode, said DC/DC converter controls a discharge current of said energy storage device such that energy in said energy storage device is discharged to be fed to said power grid;

for each of said plurality of DC/DC converters controlled by said control system, when said DC/DC converter is in energy source mode, said DC/DC converter operates to maximize power received from said renewable energy source coupled to said DC/DC converter such that power received from said renewable energy source is fed to said power grid;

said DC/DC charger operates to control a charging of said energy storage device from a separate energy source.

In a second aspect, the present invention provides a DC/DC converter subcontrol system for controlling a DC/DC converter, the subcontrol system comprising:

a mode detector block for determining whether said DC/DC converter controlled by said DC/DC converter subcontrol system is operated in energy storage mode or in energy source mode;

an MPPT processor block for executing an MPPT process;

a discharge control block for controlling a discharge of an energy storage device coupled to said DC/DC converter;

a multiplexer controlled by an output of said mode detector block;

a DC/DC controller block producing a duty cycle and a switching frequency based on data received from said multiplexer;

a modulator receiving said duty cycle and said switching frequency from DC/DC controller block;

wherein said multiplexer is coupled to said MPPT processor block and said discharge control block;

said multiplexer passes data from said MPPT processor block or from said discharge control block to said DC/DC controller block based on said output of said mode detector block;

said modulator produces gate pulses for said DC/DC converter controlled by said DC/DC converter subcontrol system based on said duty cycle and said switching frequency;

said DC/DC converter controlled by said DC/DC converter subcontrol system is coupled to receive energy from an energy source that is a renewable energy source;

when said DC/DC converter is in energy storage mode, said DC/DC converter subcontrol system controls a discharge current of said energy storage device such that energy in said energy storage device is discharged to be fed to said power grid;

when said DC/DC converter is in energy source mode, said DC/DC converter subcontrol system operates to maximize power received from said renewable energy source such that power received from said renewable energy source is fed to said power grid.

In a third aspect, the present invention provides a DC/DC charger subcontrol system for use with an energy source that charges an energy storage device, said energy storage device being coupled to at least one DC/DC converter for feeding energy discharged from said energy storage device to a power grid, the subcontrol system comprising:

a charger MPPT block for executing an MPPT process to thereby maximize power received by said charger from said energy source, said charger MPPT block generating reference values for an input voltage or an input current for use in controlling said DC/DC charger;

a power limit block for limiting a charging power for said DC/DC charger in the event said energy storage device is fully charged, said power limit block receiving said reference values from said charger MPPT block and a voltage signal from said energy storage device, said power limit block producing adjusted reference values based on said voltage signal and said reference values;

a charge controller block for producing duty cycle and switching frequency signals for said energy storage device based on said adjusted reference values received from said power limit block; and a modulator block for producing gate pulses for said DC/DC charger based on duty cycle and switching frequency signals received from said charge controller block.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 4:
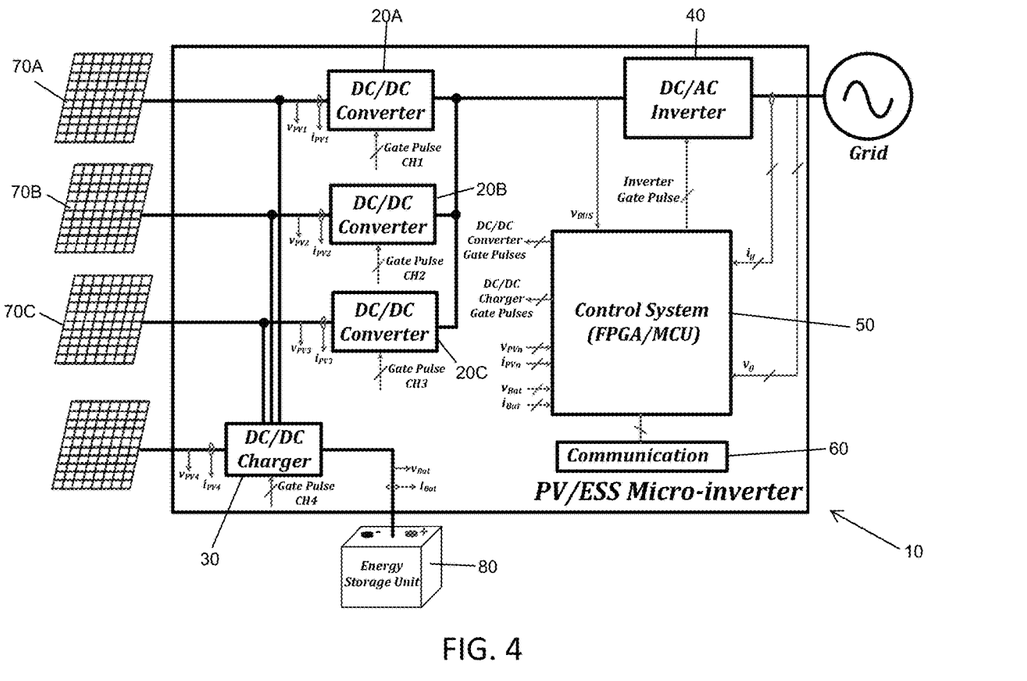
FIG. 4 is a block diagram of a system according to one aspect of the present invention.

Referring to FIG. 4, a block diagram of a PV microinverter system with energy storage capability according to one aspect of the present invention is shown. As can be seen from the Figure, the microinverter system 10 includes DC/DC converters 20A-20C, a DC/DC Charger 30, a DC/AC Inverter 40, and a control system 50 and a communication system 60. The DC/DC converters 20A, 20B, 20C are responsible for harvesting power energy from the PV panels 70A, 70B, 70C and the controllers for these converters control the discharge of a battery/energy storage device 80. The DC/DC charger 30 is responsible for charging the battery 80 from a separate energy source (e.g. PV panel) 90 and provides appropriate connection between the battery 80 and the input ports of the DC/DC converters 20A-20C. The DC/AC inverter 40 converts the DC power into AC power that is compatible with the grid and/or loads. A unified control system 50 generates the gate pulses for these converters 20A-20C as well as the gate pulses for the DC/DC charger 30. The closed-loop controllers for the DC/DC converters are implemented in the control system block 50. The control system 50 also receives and transmits information through the communications system block 60.

Figure 5:
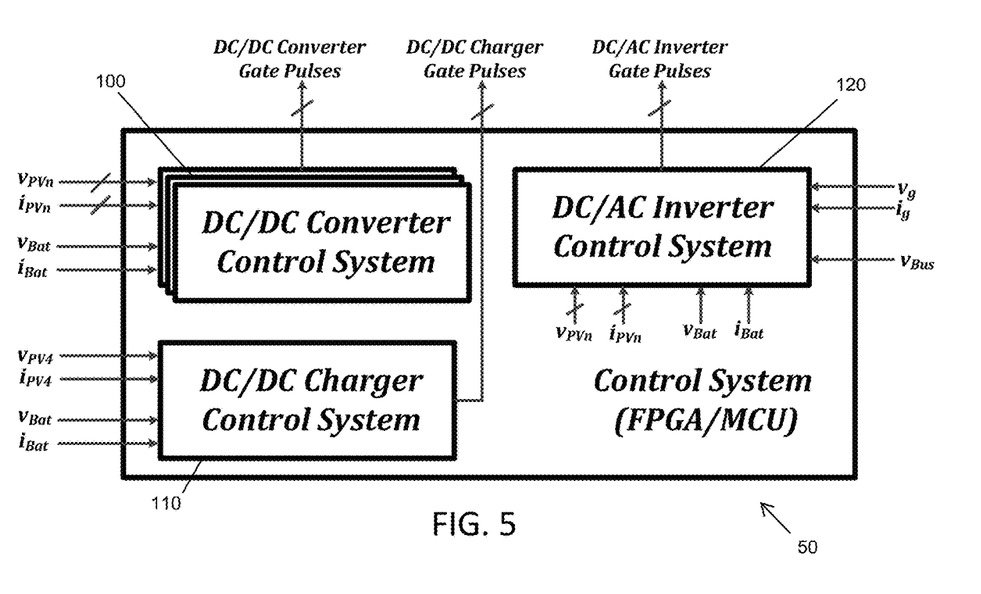
FIG. 5 is a block diagram of a control system as used in the system illustrated in FIG. 4.

Referring to FIG. 5, the block diagram of the control system 50 for the PV micro-inverter with energy storage capability is shown. As can be seen from the Figure, the control system 50 includes the following functional blocks:

DC/DC Converter Control System blocks 100. Each DC/DC converter control block 100 controls a specific DC/DC converter that is coupled to a specific PV panel. Each DC/DC converter control block 100 receives the current and voltage signals from the relevant PV panel as well as the current and voltage signal from the energy storage device 80. This converter control block 100 generates the gate pulses for the DC/DC converter that it controls. The DC/DC converter control system block 100 detects whether the DC/DC converter needs to perform maximum power point tracking for the relevant PV panel or whether the control system block 100 needs to control the discharge of the energy storage device 80.

A DC/DC charger control system block 110. The DC/DC charger control system block 110 receives the current and voltage signals from a separate energy source (in FIG. 5 this is shown as a PV panel 90) as well as the current and voltage signal from the energy storage device 80 and generates the gate pulses for the DC/DC charger 30. The DC/DC charger control system block 110 controls the charging of the energy storage device 30 from the separate PV panel 90. As should be clear, the energy storage device 30 is charged from energy harvested from the PV panel 90.

A DC/AC inverter control system block 120. The DC/AC inverter control system block 120 receives current and voltage signals from all the PV panels 70A-70C, the current and voltage signal from the energy storage device 30, the DC bus voltage, and the voltage and current signals from the grid. This block 120 generates appropriate gate pulses for the DC/AC inverter 40.

Figure 6:
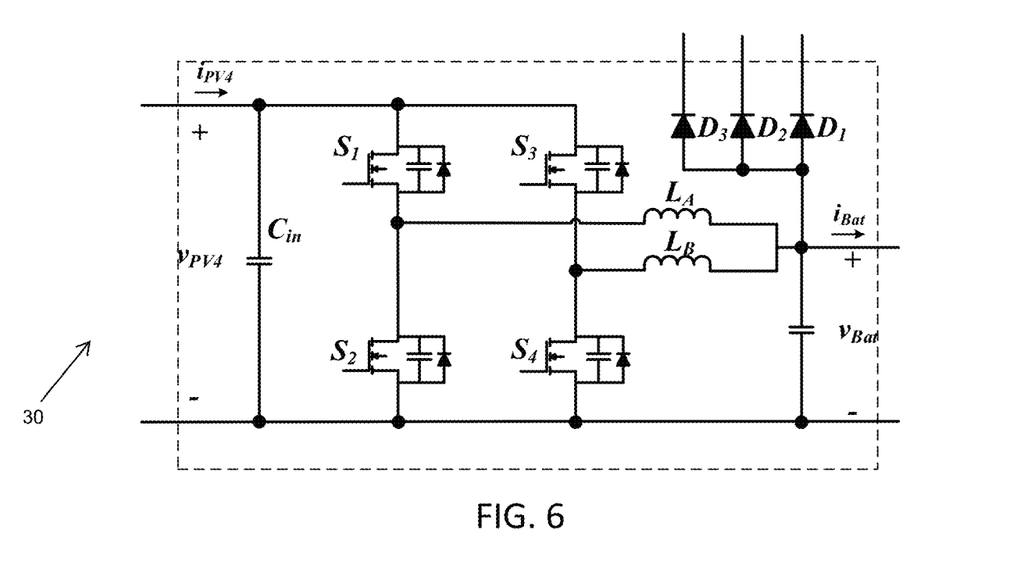
FIG. 6 illustrates an example of a circuit which may be used for the DC/DC charger illustrated in the system shown in FIG. 4.
Figure 7:
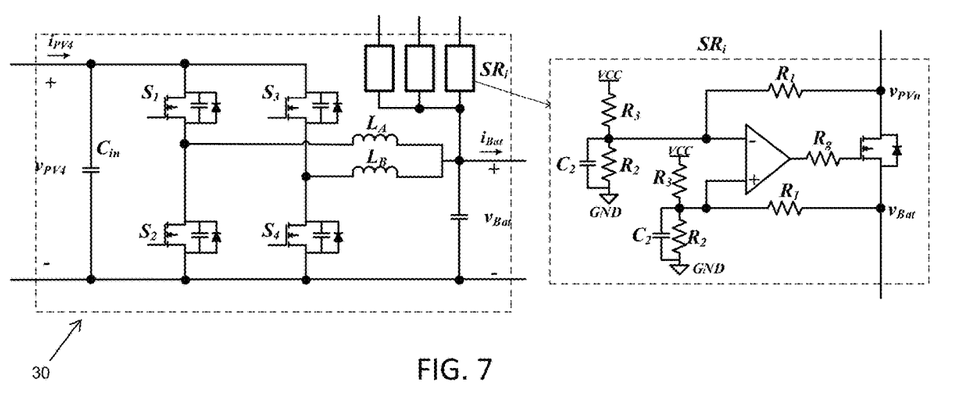
FIG. 7 shows a circuit diagram of another arrangement which may be used for the DC/DC charger used in the system shown in FIG. 4.

Referring to FIG. 6, an exemplary circuit diagram for the DC/DC Charger 30 is illustrated. In this circuit, three diodes D1-D3 are used to connect the energy storage to the input ports of the DC/DC converters 20A, 20B, 20C. FIG. 7 shows another arrangement in which the diodes are replaced by self-driven switches SR1-SR3 in order to reduce conduction losses.

Figure 8:
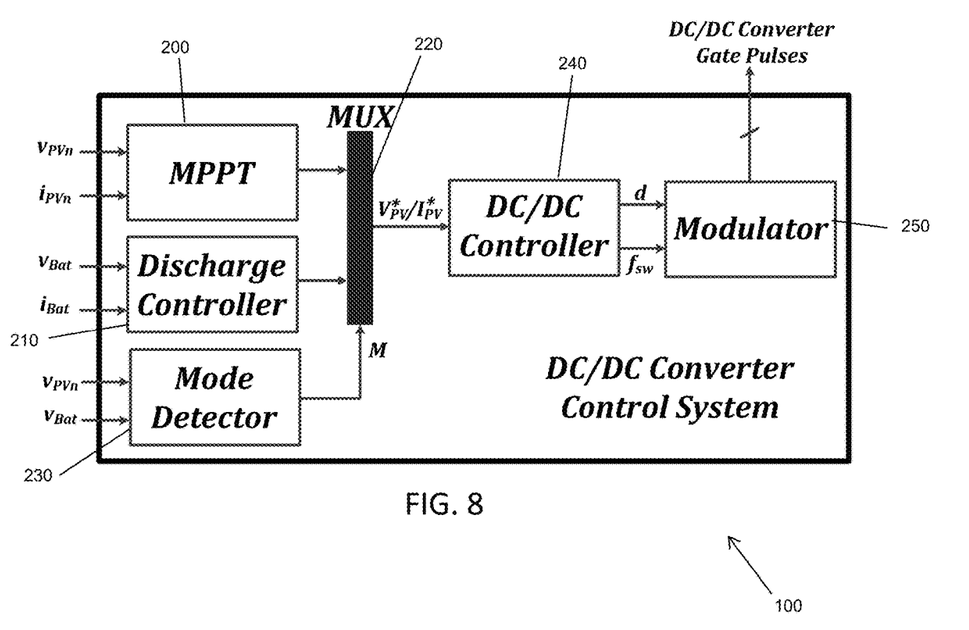
FIG. 8 is a block diagram of a DC/DC converter control system block used in the control system as shown in FIG. 5.

Referring to FIG. 8, the block diagram for a DC/DC converter control system block 100 is illustrated. It should be clear that each DC/DC converter control system block controls a DC/DC converter as shown in FIG. 5. As can be seen from the figure, the DC/DC Converter Control system block 100 includes:

A maximum power point tracking (MPPT) Block 200. This MPPT block 200 is responsible for searching for the maximum power point of the PV panel coupled to the DC/DC converter being controlled. This block 200 receives the voltage and current signals from the relevant PV panel and generates the reference value for the input voltage or input current of the DC/DC converter being controlled.

A discharge controller block 210. The discharge controller block 210 is responsible for controlling the discharge current of the energy storage device. This block 210 receives the voltage and current signals from the energy storage device and generates appropriate reference values for the input voltage or input current of the DC/DC converter being controlled.

A multiplexer (MUX) block 220. The mux block 220 selects either the MPPT block 200 or the Discharge Controller block 210 as being active. The multiplexer 220 allows signals/data from the active block (either the MPPT block or the discharge controller block) to the DC/DC controller block.

A mode detector block 230. This mode detector block 230 identifies the modes of operation for the DC/DC converter being controlled. The DC/DC converter operates in either energy storage mode or in energy source mode. In energy source mode, the DC/DC converter being controlled performs maximum power point tracking for the PV panel coupled to the DC/DC converter being controlled. In energy storage mode, the DC/DC converter being controlled controls the discharge of the energy storage device 30. This mode detector block 230 receives the PV panel voltage for the panel coupled to the DC/DC converter being controlled and the battery voltage and generates the control signal for the Multiplexer Block 220. The output of this block 230 selects either the MPPT Block or the Discharge Controller Block 210 as being active.

DC/DC Controller Block 240. This DC/DC controller block 240 receives the reference values for the input voltage or input current for the DC/DC converter being controlled and generates appropriate duty cycle (d) and switching frequency ($f_{sw}$) values for the modulator block 250.

A modulator block 250. The modulator block 250 receives the duty cycle (d) and switching frequency ($f_{sw}$) values from the DC/DC controller block 240 and, based on these values, generates the gate pulses for the DC/DC converter being controlled.

Figure 9:
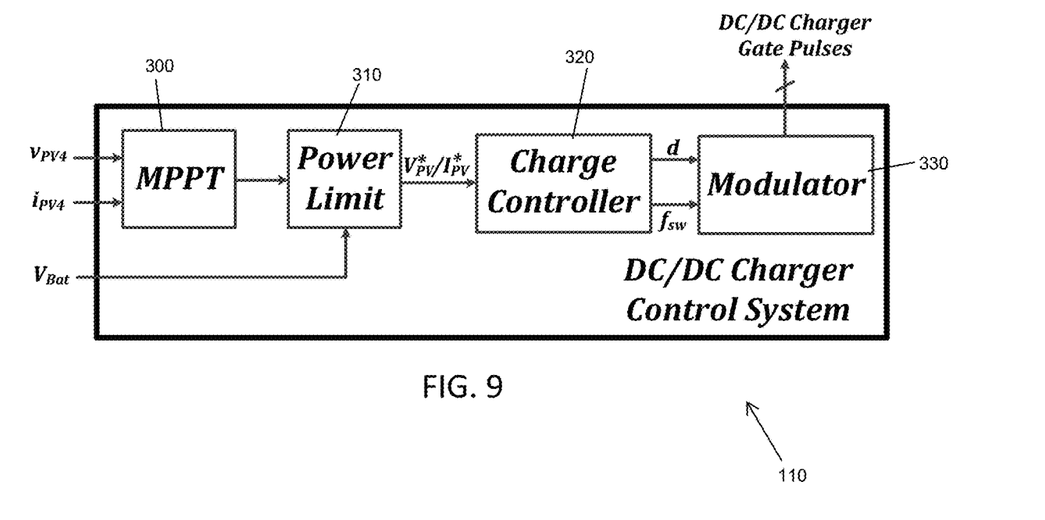
FIG. 9 is a block diagram of a DC/DC charger control system block as used in the control system illustrated in FIG. 5.

Referring to FIG. 9, the block diagram for the DC/DC charger control system block 110 is depicted. As can be seen from FIG. 9, the DC/DC charger control system block 110 includes the following functional blocks:

A charger MPPT block 300. The charger MPPT block 300 performs maximum power point tracking for the separate PV panel 90. This block 300 receives the voltage and current signals from the PV panel 90 and generates the reference values for the input voltage or input current of the DC/DC charger 30.

A power limit block 310. The power limit block 310 limits the charging power for the energy storage device 80 if the device 80 is fully charged. This block 310 generates the reference value for the input voltage or input current of the DC/DC Charger 30 based on the energy storage device voltage.

A Charge Controller Block 320. The charge controller block 320 receives the reference values for the input voltage or input current of the DC/DC Charger 30 and generates the appropriate duty cycle (d) and switching frequency ($f_{sw}$) values for the charger modulator block 330.

The charger modulator block 330. The charger modulator block 330 receives the duty cycle (d) and switching frequency ($f_{sw}$) values from the charge controller block 320 and generates the relevant gate pulses for the DC/DC Charger 30.

Figure 10:
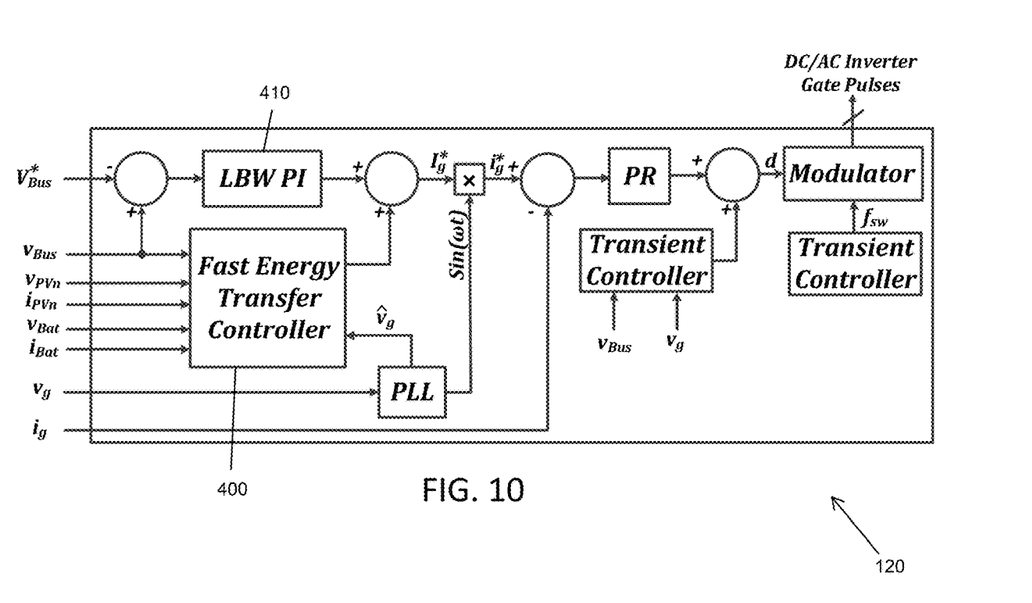
FIG. 10 is a block diagram of an inverter control system block as used in the control system shown in FIG. 5.

Referring to FIG. 10, a block diagram of the Inverter Control System block 120 is illustrated. In single-phase systems and in unbalanced three-phase systems, there may be a significant amount of double frequency voltage ripple across the DC bus capacitor. Due to the double frequency ripple present at the DC-bus, the bandwidth of the DC bus voltage controller must be limited, otherwise the grid current waveform will have significant amount of harmonics. In the present invention, the Fast Energy Transfer Controller Block 400 is used to address this problem. This block 400 adds an additional term ($I_g^{FET}$) to the output of the low-bandwidth PI (LBW PI) controller 410. The additional term ($I_g^{FET}$) is calculated based on the input power (input power: $\Sigma(v_{dc}i_{dc})$ =$P_{in}$) and the DC bus voltage ($v_{Bus}$), and the peak of the grid voltage ($\hat{v}_g$) as follows:

$$I_g^{FET} = [2\sum(v_{dc}i_{dc}) - 2\dot{E}]/\hat{v}_g$$

$$E = \frac{1}{2}C_{Bus}v_{Bus}^2$$

It should be clear that the various modules of the present invention may be implemented as ASIC (application specific integrated circuits) or as a specifically programmed microcontroller. The present invention may also be implemented using other technologies such as FPGA and DSP. Other implementations, which may use different discrete modules that, when combined, perform the functions detailed above, are also possible.

It should also be clear that the energy storage device may be a battery, a supercapacitor, or any other device that stores energy. The renewable energy source may be a PV panel as illustrated or it may be any energy source that produces DC power and is renewable and may be based on wind, solar energy, or any other natural potential power source.

As an alternative to the multiplexer in the system, the system may operate to enable/disable specific blocks instead of passing data/signals by way of the multiplexer.

It should also be clear that the present invention may use any form of MPPT processes that are known. As examples, perturb, perturb and observe, enhanced perturb and observe or any such similar variants/embodiments of MPPT processes may be used.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for feeding AC power to a power grid, the system comprising:
 a DC/AC inverter;
 a plurality of DC/DC converters, each DC/DC converter being directly coupled between an energy source and said DC/AC inverter;
 a DC/DC charger coupled to at least one of said plurality of DC/DC converters and an energy storage device;
 a control system for controlling said DC/AC inverter and for controlling at least one of said plurality of DC/DC converters and for controlling said DC/DC charger;
 wherein
 said DC/AC inverter is coupled between said power grid and said plurality of DC/DC converters;
 said energy source is a renewable energy source;
 for each of said plurality of DC/DC converters controlled by said control system, said control system automatically detects whether said DC/DC converter is operated in energy storage mode or in energy source mode;
 for each of said plurality of DC/DC converters controlled by said control system, when said DC/DC converter is in energy storage mode, said DC/DC converter controls a discharge current of said energy storage device such that energy in said energy storage device is discharged to be fed to said power grid;
 for each of said plurality of DC/DC converters controlled by said control system, when said DC/DC converter is in energy source mode, said DC/DC converter operates to maximize power received from said renewable energy source coupled to said DC/DC converter such that power received from said renewable energy source is fed to said power grid;
 said DC/DC charger operates to control a charging of said energy storage device from a separate energy source.

2. The system according to claim 1 wherein said separate energy source is a renewable energy source coupled to said DC/DC charger such that said DC/DC charger maximizes power received from said separate energy source.

3. The system according to claim 1 wherein said control system comprises:
at least one DC/DC converter subcontrol system for controlling said at least one DC/DC converter controlled by said control system;
a DC/AC inverter subcontrol system for controlling said DC/AC inverter; and
a DC/DC charger subcontrol system for controlling said DC/DC charger.

4. The system according to claim 3 wherein each of said at least one DC/DC converter subcontrol system comprises:
a mode detector block for determining whether said DC/DC converter controlled by said DC/DC converter subcontrol system is operated in energy storage mode or in energy source mode;
an MPPT processor block for executing an MPPT process;
a discharge control block for controlling a discharge of said energy storage device;
a multiplexer controlled by an output of said mode detector block;
a DC/DC controller block producing a duty cycle and a switching frequency based on data received from said multiplexer;
a modulator receiving a duty cycle and a switching frequency from DC/DC controller block;
wherein
said multiplexer is coupled to said MPPT processor block and said discharge control block;
said multiplexer passes data from said MPPT processor block or from said discharge control block to said DC/DC controller block based on said output of said mode detector block;
said modulator produces gate pulses for said DC/DC converter controlled by said DC/DC converter subcontrol system based on said duty cycle and said switching frequency.

5. The system according to claim 4 wherein said MPPT processor block executes said MPPT process based on:
a voltage reading for a voltage produced by said DC/DC converter controlled by said DC/DC converter subcontrol system; and
a current reading for current produced by said DC/DC converter controlled by said DC/DC converter subcontrol system.

6. The system according to claim 4 wherein said mode detector detects a mode of operation of said DC/DC converter controlled by said DC/DC converter subcontrol system based on voltages produced by said DC/DC converter controlled by said DC/DC converter subcontrol system block and voltages produced by said energy storage device.

7. The system according to claim 3 wherein said DC/DC charger subcontrol system comprises:
a charger MPPT block for executing an MPPT process to thereby maximize power received by said charger from said separate energy source, said charger MPPT block generating reference values for an input voltage or an input current for use in controlling said DC/DC charger;
a power limit block for limiting a charging power for said DC/DC charger in the event said energy storage device is fully charged, said power limit block receiving said reference values from said charger MPPT block and a voltage signal from said energy storage device, said power limit block producing adjusted reference values based on said voltage signal and said reference values;
a charge controller block for producing duty cycle and switching frequency signals for said energy storage device based on said adjusted reference values received from said power limit block;
a modulator block for producing gate pulses for said DC/DC charger based on duty cycle and switching frequency signals received from said charge controller block.

8. The system according to claim 2 wherein said DC/AC inverter control subsystem includes a Fast Energy Transfer Controller block for limiting a bandwidth of a DC bus voltage controller.

9. A DC/DC converter subcontrol system for controlling a DC/DC converter, the subcontrol system comprising:
a mode detector block for determining whether said DC/DC converter controlled by said DC/DC converter subcontrol system is operated in energy storage mode or in energy source mode;
an MPPT processor block for executing an MPPT process;
a discharge control block for controlling a discharge of an energy storage device coupled to said DC/DC converter;
a multiplexer controlled by an output of said mode detector block;
a DC/DC controller block producing a duty cycle and a switching frequency based on data received from said multiplexer;
a modulator receiving said duty cycle and said switching frequency from DC/DC controller block;
wherein
said multiplexer is coupled to said MPPT processor block and said discharge control block;
said multiplexer passes data from said MPPT processor block or from said discharge control block to said DC/DC controller block based on said output of said mode detector block;
said modulator produces gate pulses for said DC/DC converter controlled by said DC/DC converter subcontrol system based on said duty cycle and said switching frequency;
said DC/DC converter controlled by said DC/DC converter subcontrol system is coupled to receive energy from an energy source that is a renewable energy source;
when said DC/DC converter is in energy storage mode, said DC/DC converter subcontrol system controls a discharge current of said energy storage device such that energy in said energy storage device is discharged to be fed to said power grid;
when said DC/DC converter is in energy source mode, said DC/DC converter subcontrol system operates to maximize power received from said renewable energy source such that power received from said renewable energy source is fed to said power grid.

10. The subcontrol system according to claim 9 wherein said MPPT processor block executes said MPPT process based on:
a voltage reading for a voltage produced by said DC/DC converter controlled by said DC/DC converter subcontrol system and
a current reading for current produced by said DC/DC converter controlled by said DC/DC converter subcontrol system.

11. The system according to claim 9 wherein said mode detector detects a mode of operation of said DC/DC converter controlled by said DC/DC converter subcontrol system based on voltages produced by said DC/DC converter controlled by said DC/DC converter subcontrol system block and voltages produced by said energy storage device.

12. A DC/DC charger subcontrol system for use with an energy source that charges an energy storage device, said energy storage device being coupled to at least one DC/DC converter for feeding energy discharged from said energy storage device to a power grid, the subcontrol system comprising:
- a charger MPPT block for executing an MPPT process to thereby maximize power received by said charger from said energy source, said charger MPPT block generating reference values for an input voltage or an input current for use in controlling said DC/DC charger;
- a power limit block for limiting a charging power for said DC/DC charger in the event said energy storage device is fully charged, said power limit block receiving said reference values from said charger MPPT block and a voltage signal from said energy storage device, said power limit block producing adjusted reference values based on said voltage signal and said reference values;
- a charge controller block for producing duty cycle and switching frequency signals for said energy storage device based on said adjusted reference values received from said power limit block; and
- a modulator block for producing gate pulses for said DC/DC charger based on duty cycle and switching frequency signals received from said charge controller block.

* * * * *